United States Patent [19]

Dugan et al.

[11] Patent Number: 4,501,227
[45] Date of Patent: Feb. 26, 1985

[54] METHOD AND APPARATUS FOR REARING POST-LARVAE SHRIMP

[75] Inventors: Charles Dugan, Goulds; Timothy Dugan, Homestead, both of Fla.

[73] Assignee: Farm Fresh Shrimp Corporation, Fort Lauderdale, Fla.

[21] Appl. No.: 580,769

[22] Filed: Feb. 21, 1984

Related U.S. Application Data

[60] Continuation of Ser. No. 263,500, May 14, 1981, abandoned, which is a division of Ser. No. 952,664, Oct. 18, 1978, Pat. No. 4,285,298.

[51] Int. Cl.³ ............................................. A01K 61/00
[52] U.S. Cl. ...................................................... 119/2
[58] Field of Search ........................................ 119/2, 3

[56] References Cited

U.S. PATENT DOCUMENTS 4,086,875 5/1978 Lindbergh .............................. 119/3

Primary Examiner—Hugh R. Chamblee
Attorney, Agent, or Firm—Kenyon & Kenyon

[57] ABSTRACT

A method and apparatus for rearing post-larvae shrimp wherein the shrimp are retained for an initial post-larvae period of growth in a first shrimp rearing means including a first habitat means comprising a first plurality of stacked substrates having a first combined total surface area and wherein the shrimp are retained for at least one subsequent period of growth in at least one further shrimp rearing means including a second habitat means comprising a second plurality of stacked substrates having a second combined total surface area greater than the aforesaid first combined total surface area. In further aspects of the invention, unique filtration means and culling means are also disclosed.

2 Claims, 15 Drawing Figures

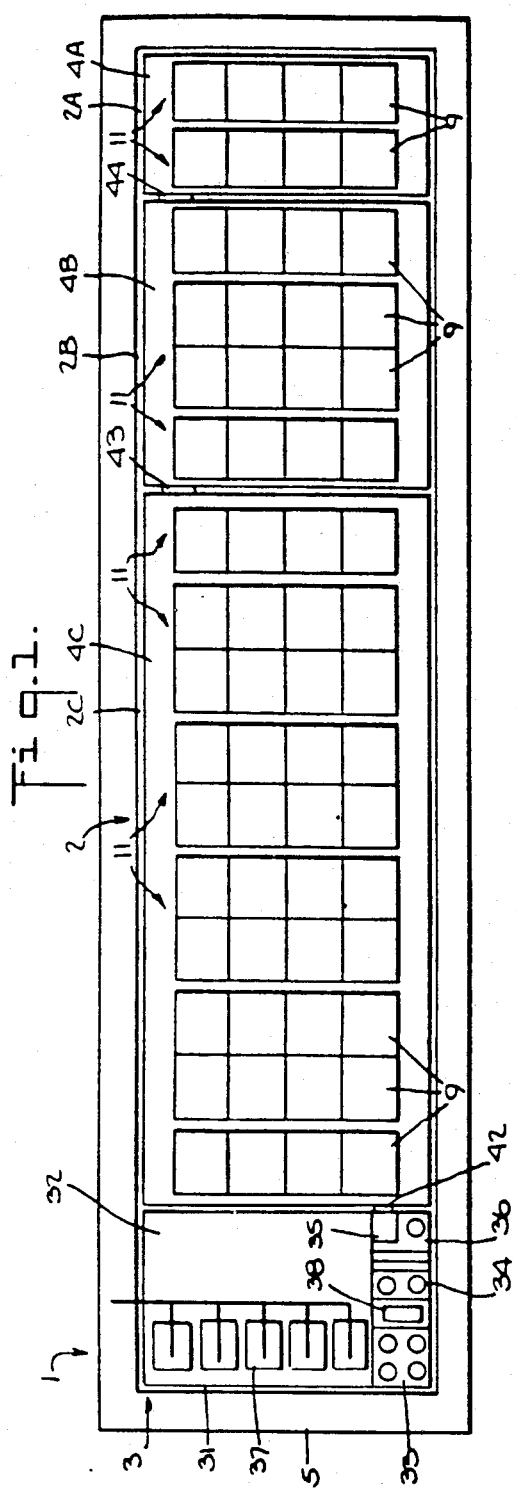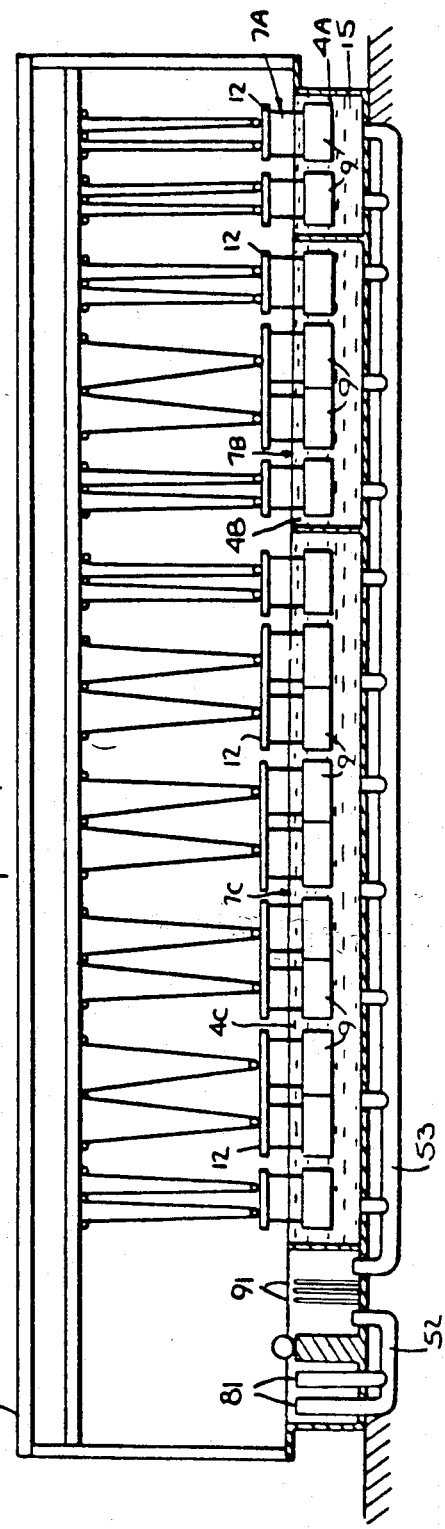

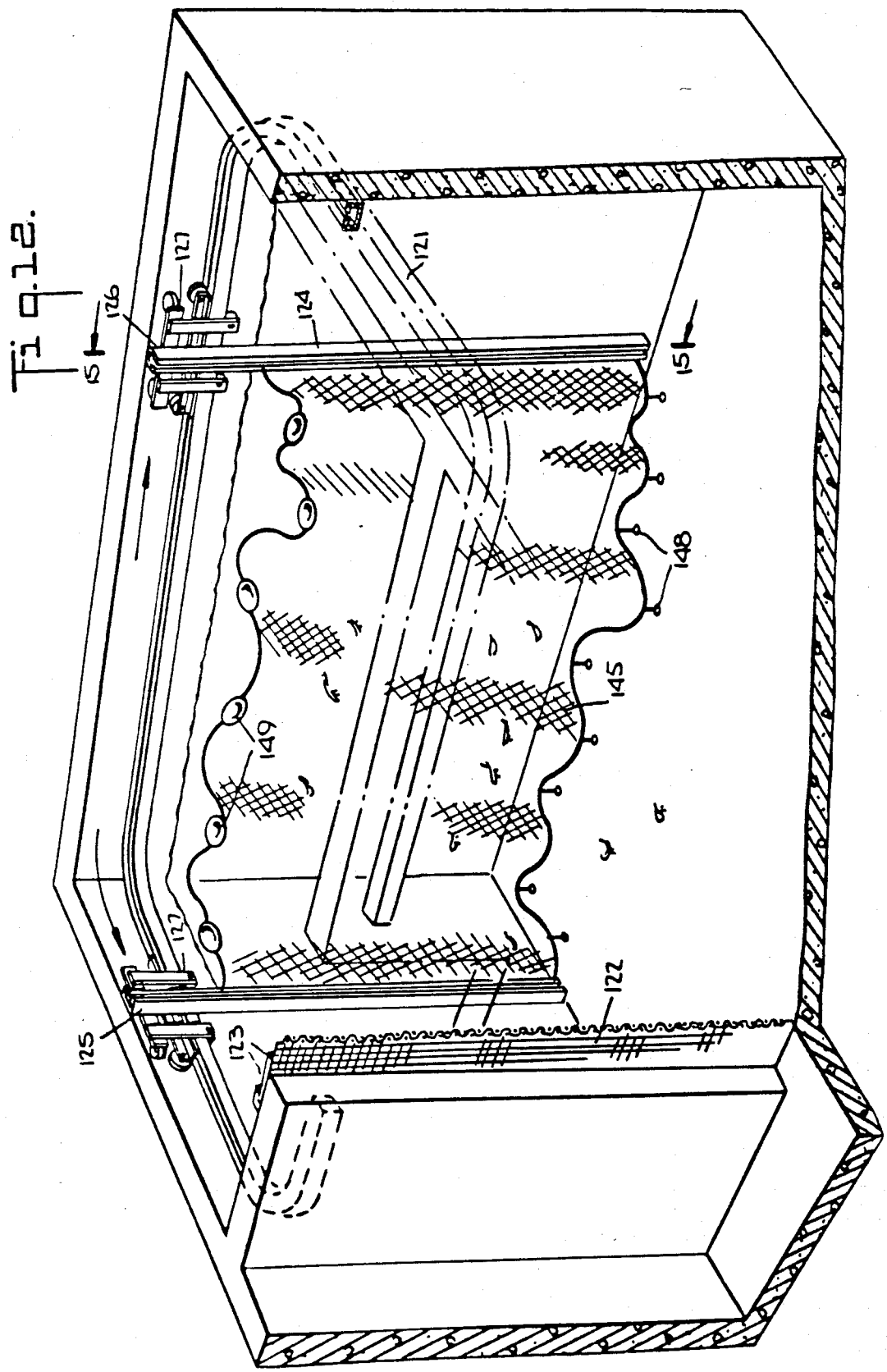

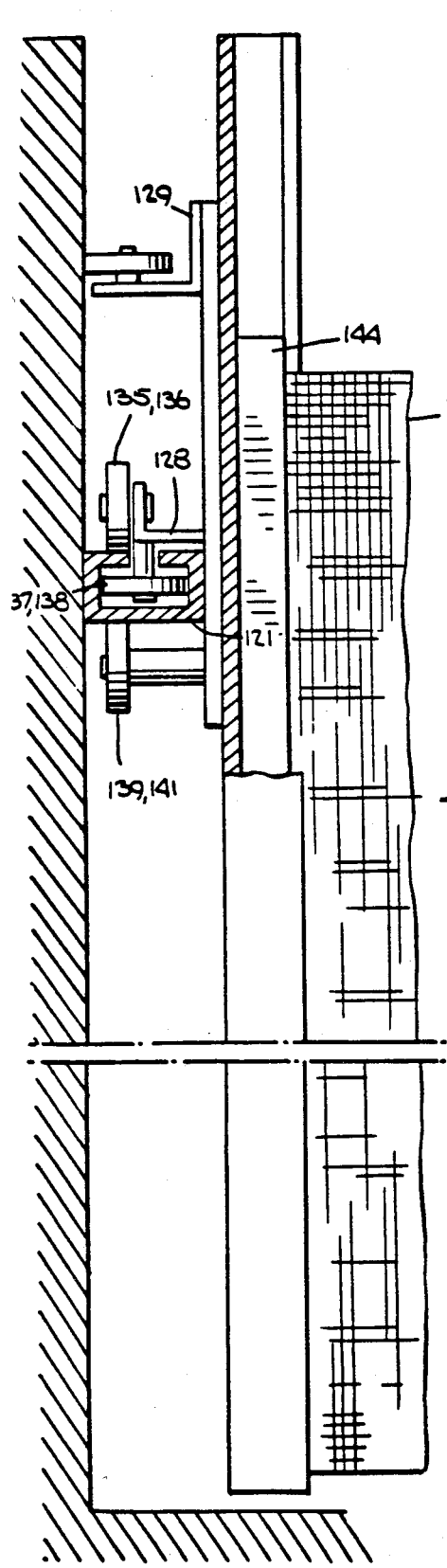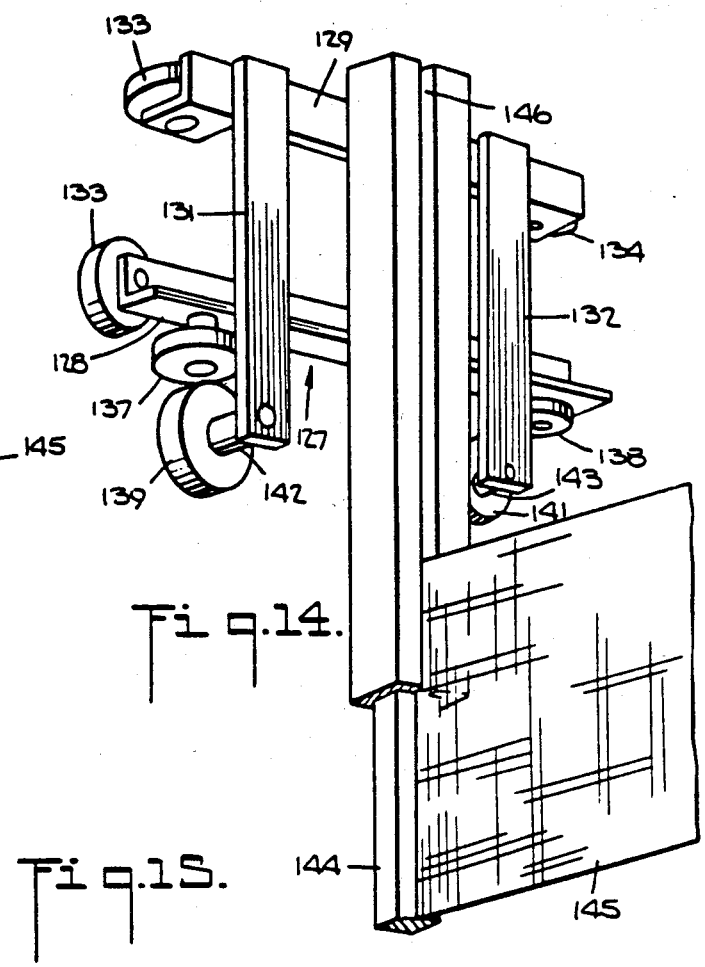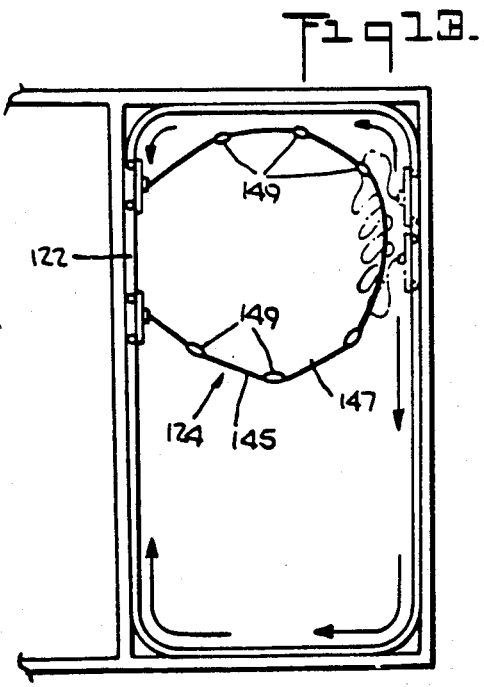

METHOD AND APPARATUS FOR REARING POST-LARVAE SHRIMP

This application is a continuation of application Ser. No. 263,500, filed May 14, 1981, now abandoned, which is a division of application Ser. No. 952,664, filed Oct. 18, 1978, now U.S. Pat. No. 4,285,298.

BACKGROUND OF THE INVENTION

This invention pertains to a method and apparatus for rearing shrimp and, in particular, to a method and apparatus for rearing post-larvae shrimp under controlled conditions.

In recent years attempts have been made to rear post-larvae shrimp under controlled conditions. Rearing shrimp in this manner has been carried out employing so-called intensive culture systems and methods.

Systems of this type have been proposed wherein the post-larvae shrimp are reared in a succession of units each being provided with habitat structures for the shrimp. U.S. Pat. No. 3,658,034 issued on Apr. 25, 1972 discloses one such system wherein the initial unit of the system comprises a tank provided with a habitat structure formed from a plurality of vertical substrates. Following this initial unit, are a number of further units which include tanks of increasing size and each of which is provided with a habitat structure formed from a number of cylindrical enclosures each for housing an individual shrimp. In this system, the tanks are disposed below one another so the shrimp content of a higher tank can be emptied into a lower tank when the shrimp in the higher hank have undergone a desired degree of growth. Moreover, in this system, the water in each tank is continuously circulated to remove contaminants therefrom.

Further U.S. patents which disclose intensive culture systems wherein vertically or horizontally aligned substrates provide habitats for post-larvae shrimp are as follows: U.S. Pat. No. 3,985,101 issued on July 2, 1975; No. 3,916,833 issued on Nov. 4, 1975; and No. 3,889,639 issued on June 17, 1975. In the last named patent, the intensive culture system disclosed comprises a plurality of horizontally arranged nets and a filtration system whose filter is backwashed by drainage of some of the water of the system. Moreover, in this system, light is directed through the central area of the nets to attract molting shrimp to such areas and thereby prevent these shrimp from being cannibalized by the remaining non-molting shrimp.

It is an object of the present invention to provide an improved system and method for rearing shrimp under controlled conditions on a commercial scale.

It is a further object of the present invention to provide a system and method for rearing shrimp wherein use of the rearing volume is maximized in a manner that does not contribute to shrimp mortality.

It is yet a further object of the present invention to provide a system and method for rearing shrimp wherein filtration of the rearing medium is carried out in an advantageous manner.

SUMMARY OF THE INVENTION

In accordance with the principles of the present invention, the above and other objectives are realized in a system and apparatus comprising a first shrimp rearing unit for retaining shrimp for an initial post-larvae shrimp growing period including a first habitat structure formed from a first plurality of stacked substrates having a first combined total surface area and at least one further shrimp rearing unit for retaining shrimp for a subsequent shrimp growing period including a second habitat structure formed from a second plurality of stacked substrates having a second combined total surface area greater than the aforesaid first combined total area.

More particularly, the first combined total surface area is selected so that the unit area per shrimp of the first plurality of substrates is sufficiently large to encourage and promote the growth of shrimp of sizes encompassed by the first shrimp growing period. The second combined total surface area, in turn, is selected to be greater than the first by an amount which results in a unit area per shrimp of the second plurality of substrates which is sufficiently large to encourage and promote the growth of shrimp of sizes encompassed by the second shrimp growing period. Preferably, the total second surface area and the unit area per shrimp of the second plurality of substrates should be from 25 to 200 percent greater than the total first surface area and the unit area per shrimp, respectively, of the first plurality of substrates.

By providing both the first and second rearing units with habitat structures formed from stacked substrates, the volume of the units for rearing shrimp is maximized for both the initial and subsequent post-larvae growing periods. Moreover, the use of stacked substrates for the subsequent growth period is found to better promote shrimp growth and life as compared to systems using other types of habitat structures for this growth period.

In a further aspect of the invention, the system is additionally provided with a filtration system which accomplishes filtration of the rearing units through the use of a single pump. The remainder of the filtration system operates via gravity flow. The aforesaid filtration system is additionally provided with uniquely constructed filtration assemblies (i.e., particulate filters, bio-filter, carbon filters and foam fractioners) for appropriately filtering the medium of the rearing units.

The system and method of the invention also contemplate the use of a novel technique and apparatus for movement of the shrimp from one unit to the other and for eventually harvesting same.

BRIEF DESCRIPTION OF THE DRAWINGS

The above and other features and aspects of the present invention will become more apparent upon reading the following detailed description, in conjunction with the accompanying drawings in which:

FIG. 1 shows in schematic fashion an overall view of an intensive culture unit embodying an apparatus and method in accordance with the principles of the present invention;

FIG. 2 illustrates, in partial cross section, a side view of the intensive culture unit of FIG. 1;

FIGS. 10 and 11 illustrate cross sections of the foam fractionator of FIG. 7 taken along the lines 10—10 and 11—11 of FIG. 7; and FIGS. 12-15 show various views of the culling apparatus of one of the shrimp rearing units of FIG. 1.

DETAILED DESCRIPTION

Figure 3:
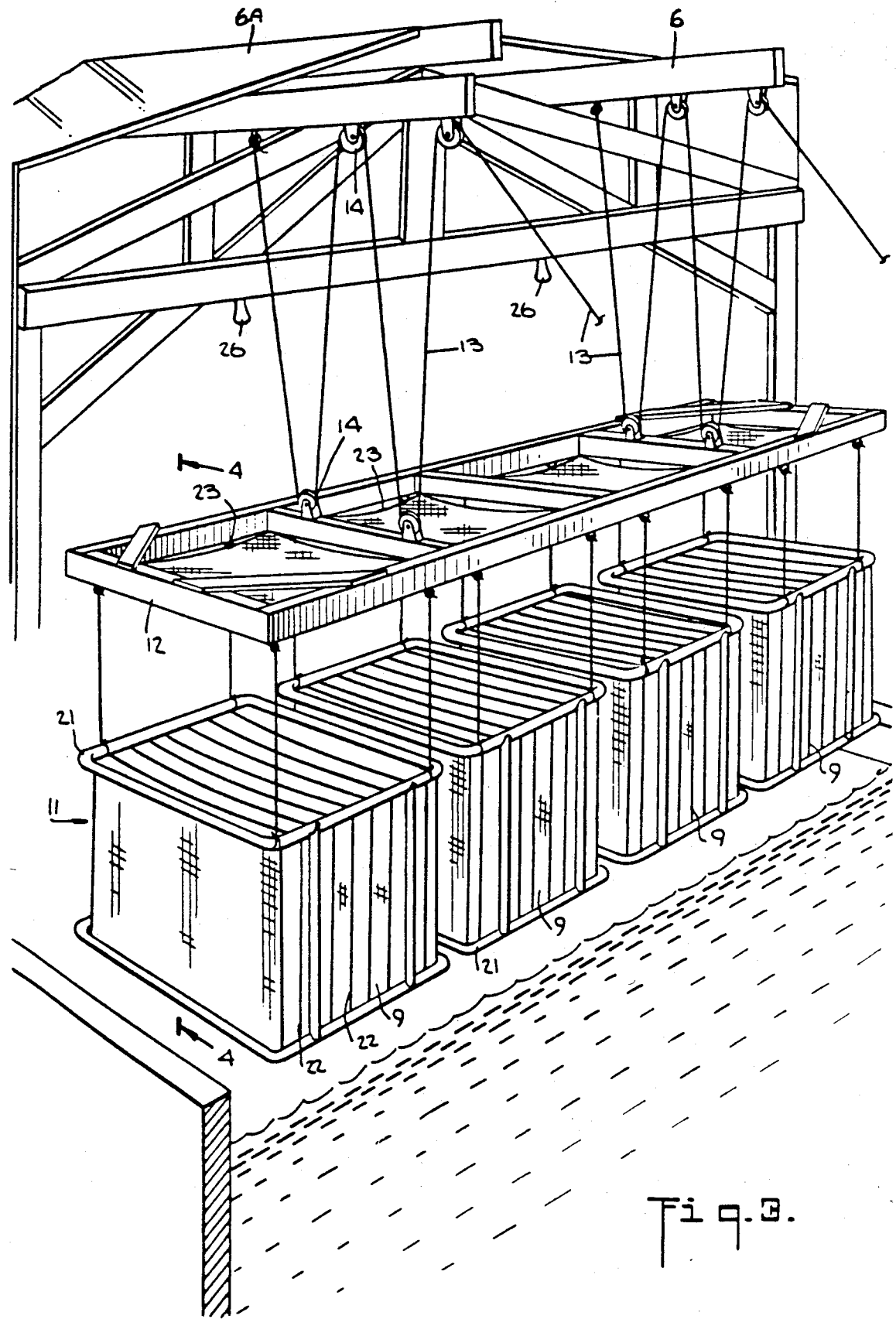
FIG. 3 illustrates, in perspective view, a habitat structure and support assembly of a shrimp rearing unit of the intensive culture unit of FIG. 1.

FIG. 1 illustrates an overall view of an intensive culture system or unit 1 for rearing post-larvae shrimp in accordance with the principles of the present invention. The system includes a shrimp rearing area 2 comprised of three adjacent shrimp rearing units 2A, 2B and 2C and a filtration area 3 adjacent the rearing unit 2C. The rearing units 2A, 2B and 2C comprise rearing tanks 4A, 4B and 4C whose walls are formed from cinder blocks as are those of the filtration area 3. A further cinder block area forms a walkway 5 around the rearing units and the filtration area. This walkway and the walls of the rearing tanks and filtration area support a frame structure 6 on whose exterior is placed a plastic roof 6A (See, FIGS. 2 and 3) so as to form a fully enclosed system. Advantageously, in the area of the rearing units the plastic of the aforesaid roof is clear so that the roof acts to couple solar energy into the system for heating same.

The rearing tank 4A of the rearing unit 2A holds post-larvae shrimp for an initial stage or period of post-larvae growth, while the tank 4B of the unit 2B holds shrimp who have completed this initial period of growth for a second growth stage. The tank 4C of the unit 2C, in turn, holds shrimp who have undergone the aforesaid second growth stage and until the shrimp reach maturity. As is apparent, the rearing tanks increase in volume, in going from the tank 4A holding the shrimp who are in the initial post-larvae growth stage to the tank 4C holding the shrimp that reach maturity. In the present illustrative case, this is accomplished by increasing the length of the tanks, while maintaining their widths constant. The purpose of this increased volume is to permit the use in the rearing units of habitat structures comprised of stacked substrates which increase in total surface area in going from the rearing tank 4A to the rearing tank 4C. This increased surface area accommodates the increase in size of the shrimp, thereby affording sufficient habitat area for promoting growth, while maximizing the volume of the tanks useable for rearing.

As shown in FIGS. 1 and 2, the rearing units 2A, 2B and 2C thus include habitat structures 7A, 7B and 7C. The aforesaid habitat structures 7A, 7B and 7C are advantageously all constructed from a basic substrate unit 9, the larger area structures being provided with an increased number of units to provide the increased area.

In the present illustrative case, the habitat structure 7A includes eight substrate units, the habitat structure 7B, sixteen substrate units and the habitat structure 7C, forty substrate units. The substrate units of each habitat structure, in turn, are arranged in banks 11 formed of one or more columns of substrate units (FIGS. 1, 2 and 3). Each such bank is supported on a common rectangular frame 12 which permits the bank to be inserted and lifted from the tank of its respective rearing unit. As shown, the substrate units of the banks are tied to their respective frames so they hang therefrom upon insertion into the rearing tanks.

The substrate banks 11 are lowered and raised from their respective rearing tanks via the lines 13 of individual pulley systems 14 associated with the banks and supported on the frame 6. These pulley systems, in turn, are activated by winches (not shown) also supported on the frame. When lowered into the rearing tanks the banks 11 are maintained at a predetermined height above the tank bottoms. This facilitates feeding of the shrimp as well as filtration of the tanks and clearing of the tank bottom. The banks are also maintained below the surface of the medium 15 in their respective tanks.

Figure 4:
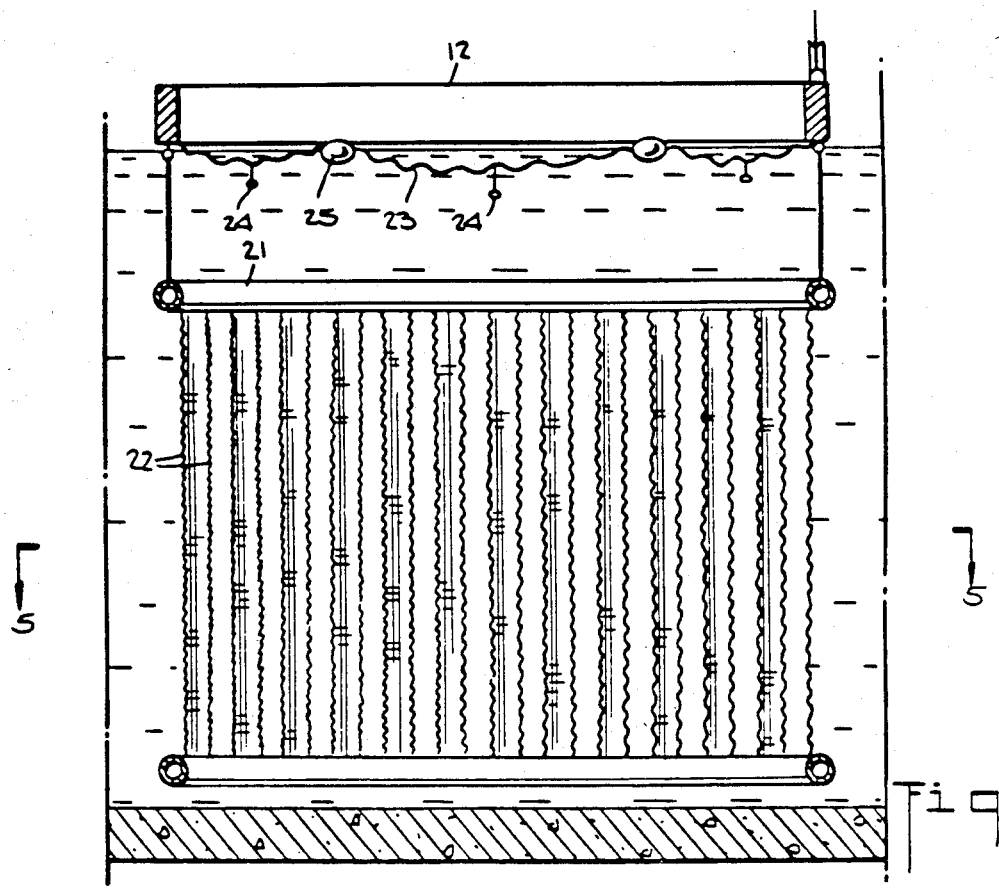
FIG. 4 illustrates, in cross section taken along line 4—4 in FIG. 3, one of the substrate units of the habitat structure of FIG. 3 lowered into a rearing tank.
Figure 5:
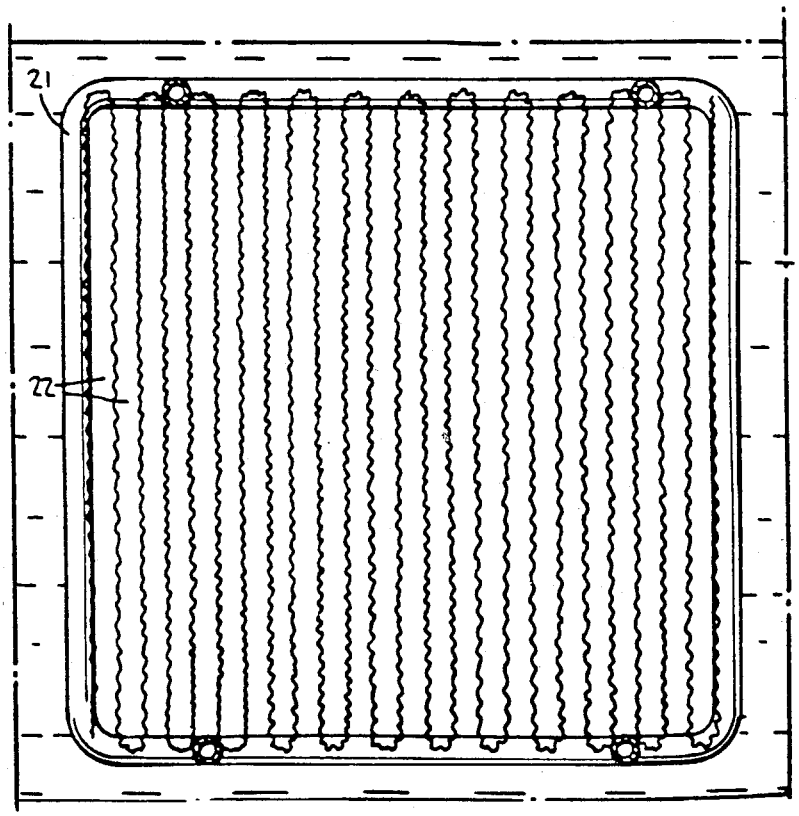
FIG. 5 shows a cross section of the substrate unit of FIG. 4 taken along the line 5—5 in FIG. 4.

As shown in FIGS. 3 to 5, each of the substrate units 9 comprises a three dimensional open rectangular frame 21 formed of tubing members. Stretched across opposite sides of the frame are a plurality of parallel substrates 22 which, as shown, are formed of meshed screening. These horizontally displaced vertically arranged stacked substrates or screens 22 serve as the habitats for the shrimp who crawl up them. The spacing between the substrates 22 of each substrate unit 9 is dependent upon a number of factors, such as, for example, the rearing unit in which the substrate unit is to be situated, the size of the shrimp in such rearing unit, etc. Typically, the spacing may be in the range of 2 to 3 inches depending on the aforesaid factors.

As above mentioned, the increase in total surface area of the substrates of each habitat structure relative to that of the preceding structure is dependent upon the increased unit area per shrimp required to sustain and encourage growth of the shrimp in each particular rearing unit relative to that required in the preceding unit. The unit area per shrimp for encouraging growth in a particular rearing unit, of course, will depend heavily on the growth stage associated with that unit, as relatively larger growth stages will result in shrimp of relatively larger increased size and will require a proportionally relatively larger unit area per shrimp to encourage growth. The number of growth stages employed, in turn, is dependent upon the desire to limit the system and, hence, the growth stages to a minimum so as to preserve compactness and minimize labor, while at the same time affording a sufficient number of growth stages so that the difference in size of the shrimp in each stage and, hence, in a given rearing unit tank, is not such as to permit a large degree of cannibalism of the smaller shrimp by the larger shrimp.

With these conditions in mind, it has been found that the growth stages subsequent to the initial stage may encompass an increased growth in a range from 25 to 200 percent before either the number of rearing units becomes too large, or the difference in the size of the shrimp in each stage results in excessive mortality due to cannibalism. This means that each growth stage subsequent to the initial stage may encompass an increase in size of from 25 to 200 percent which, in turn, means that the increase in total substrate area and, hence, unit area per shrimp from one rearing unit to a subsequent unit will also be approximately in the range from 25 to 200 percent.

In one embodiment of the present invention, it has been found desirable to select the initial growth stage to encompass a 200 percent growth from post-larvae size and each of the subsequent growth stages a 100 percent increase in growth relative to the preceding stage. Thus, with this embodiment of the invention three growth stages are required for the shrimp to increase in size from their initial post-larvae size of approximately one-half inch to their adulthood size of 6 inches. In particular, the initial stage covers the growth period from ½ to 3/2 inches, the second stage from 3/2 to 3 inches and the final stage from 3 inches to 6 inches. Furthermore, in this embodiment, the number of rearing units is three, as depicted, and the substrate units of the rearing unit holding the shrimp in the final stage have a total combined surface area which is 100 percent greater than that of the units holding the shrimp in the middle stage, the surface area of the latter substrate units, in turn, being 100 percent greater than that of the units holding the shrimp in the initial stage. Additionally, in this embodiment, the number of substrate units per stage is as depicted in FIG. 1, and the first and second growth stages each cover approximately a 6 week period and the final growth stage covers approximately a 3 month period.

In order to further facilitate rearing of the shrimp and to further prevent the cannibalistic tendencies of the shrimp from increasing mortality, each rearing unit 2A, 2B and 2C is further provided with molting areas which act as sanctuaries for molting shrimp who have lost their outer shell and, therefore, are prone to attack from non-molting shrimp. As shown, these areas are provided by mesh netting sections 23 which are attached to the frames 12 and hang therefrom above the substrate banks 11. When the banks 11 are lowered into their respective rearing tanks these netting sections lie within the tank medium immediately above the substrate units, and, hence, are accessible to molting shrimp whose tendency when molting is to seek shelter away from the other shrimp.

To further facilitate use of these molting platforms, the netting sections 23 are provided with means for creating high and low spots relative to the substrate units. This is simply and easily realized by attaching leads 24 and floats 25 to alternate positions along the netting. The low spots provide areas where the molting shrimp can attach themselves to the nets and the high spot areas where the attacked shrimp can crawl to isolate them further from the other shrimp. Additional isolation is achieved by providing dim lighting in the area of the netting sections 23, this being accomplished by lights 26 attached to the frame 6 and directed at the sections.

In order to facilitate the transferring of the shrimp from the rearing unit 2A to the unit 2B and from the rearing unit 2B to the unit 2C and to facilitate the removal of adult shrimp from rearing unit 2C, a similar culling apparatus is provided in each of the rearing tanks 4A, 4B and 4C. This apparatus permits selection of the shrimp who have reached the desired stage of growth or development to be transferred to or removed from their respective rearing tank quickly and efficiently. More specifically, as illustrated in FIGS. 12 through 15, each tank is provided with a slotted track 121 which extends substantially around the periphery of its four walls and whose ends terminate adjacent an elongated opening 122 closed by a screen 123 in the wall of the tank adjacent the next tank. The track 121 provides a guide means for a net structure 124 whose ends are moved in opposite directions so as to provide an enclosed area 147 including the screened opening 122.

More specifically, the net structure 124 comprises two similar elongated hollow bars 125 and 126 each of which is provided with a guide structure 127 at its upper end. The guide structure comprises two horizontal rails 128 and 129 which are crossed by two vertical rails 131 and 132. The upper horizontal rail 129 carries at its opposite ends horizontally oriented rollers 133 and 134. The lower horizontal rail 128 also carries at its opposite ends rollers 135 and 136, these rollers being oriented vertically. Inboard of the rollers 135 and 136, the rail 128 supports two wheels 137 and 138 arranged with their axes vertical. Two further wheels 139 and 141 having horizontal axes are connected via bars 142 and 143 to the lower ends of the vertical rails 131 and 132.

Inserted in each of the hollow bars 125 and 126 is a tubular plastic member 144. The members 144 support opposite ends of a mesh net 145. The net 145, in turn, passes through vertical slots 146 in the bars 125 and 126 and its draw strings are gathered together at a common point above the top end of one of the bars. The net 145 is further provided with leads 148 and floats 149 which maintain the net in a vertically stretched condition.

In operation, the net structure 124 is placed in a respective tank with the wheels 137 and 138 of the guide structures 127 of the bars 125 and 126 inserted in the track slot. The rollers 135 and 136 and the wheels 139 and 141 of the guides, in turn, engage the upper and lower walls of the track to prevent tilting. The two bars 125 and 126 are then moved in opposite directions until each arrives at an end of the screened opening 122 in the tank wall. During such movement, the wheels 133 and 134 of the guide structures ride on the inner wall of the tank to further guide the net structure. With the two bars 125 and 126 adjacent the ends of the opening 122, the net 145 now forms the enclosed area 147, which area includes the opening 122 and surrounds substantially all the shrimp in the tank. The draw strings of the net 145 are then pulled, allowing those shrimp who are smaller than the openings in the net to escape. The aforesaid openings are selected to be approximately equal in size (i.e., about 10 percent smaller) than the size of shrimp who have undergone the stage of development associated with the particular rearing tank. As a result, the shrimp who remain trapped in the localized area 147 surrounding the opening 122 are those who have substantially undergone the desired degree of growth. The screen 123 closing the opening is then slid upward and the aforesaid trapped shrimp move through the opening. If the tank in which the net structure is placed is either one of the rearing tanks 4A or 4B the shrimp are transferred to the subsequent rearing tank, either the tank 4B or 4C. If on the other hand, the tank is the last rearing tank 4C, then the shrimp enter a harvesting container and are removed from the system.

As above-mentioned, the system of the invention is also provided with a filtration area 3 located adjacent the rearing unit 2C. This filtration area provides filtration for the rearing tanks of the rearing units and maintains the medium 15 therein substantially contaminant free.

Figure 6:
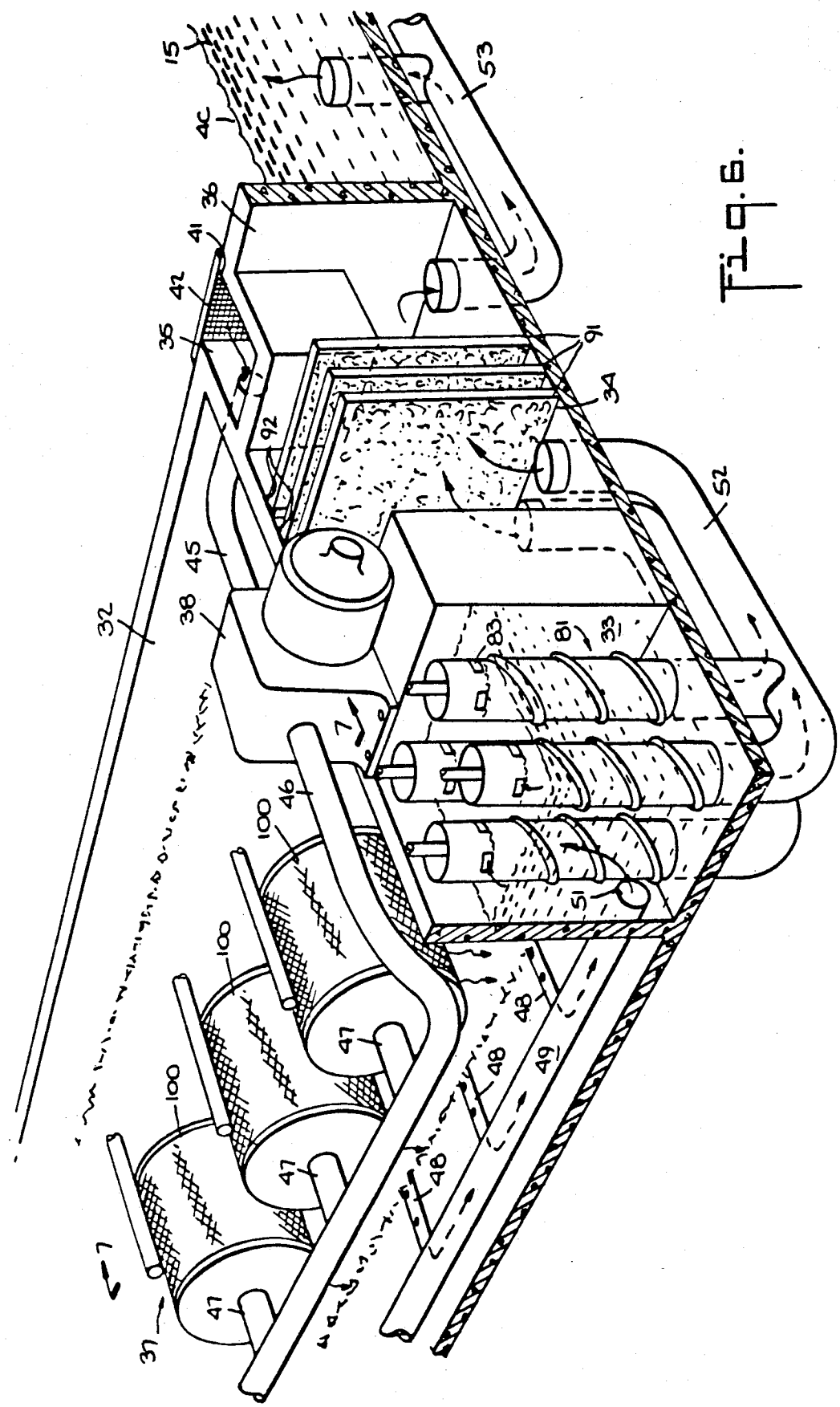
FIG. 6 illustrates, in perspective view, the overall filtration system of the intensive culture unit of FIG. 1.

More particularly, as shown in FIGS. 1, 2 and 6, the filtration area 3 comprises a tank 31 which is partitioned by walls into a bio-filter filtration section 32, a foam fractionator filtration section 33, a carbon filter filtration section 34 and filtration inlet and outlet sections 35 and 36. The tank 31 also supports a particulate filter filtration assembly 37 which is situated above the bio-filter section 32 and a pump 38 which is situated on the tank wall separating the foam fractionator carbon filter sections 33 and 34. The filtration inlet section 35 borders an aperture 41 closed off by a screen 42 in the wall of the rearing tank 4C. Medium 15 from the rearing tank 4C, as well as the medium from the rearing tanks 4A and 4B and flowing into the tank 4C through the screened apertures 43 and 44 (see, FIG. 1), thus enters the inlet section 35 through the screen 42. A cylindrical conduit 45 connects the intake of the pump 38 to the inlet section 35 and the pump 38 raises the energy of the medium flowing into the inlet section to a level or head sufficient to carry the medium, via gravity flow, through all the filtration sections and back to the rearing tanks. Filtering is thus carried out using a single pump and gravity flow, thereby minimizing the energy requirements needed for operation.

More specifically, the medium entering the pump 38 is coupled to the pump output which feeds a manifold 46 which couples the medium to cylindrical inputs 47 of the particulate filter assembly 37. These inputs feed a plurality of particulate filters 100 forming the filter assembly 37 and supported above the bio-filter section 32 on the walls of tank 31 forming same. The medium passes through the filter assembly 37, descends down through the bio-filter section 32 and is collected in apertured pipes 48 at the bottom thereof. The pipes 48, in turn, lead to a collector pipe 49 which carries the medium through an aperture 51 in the tank wall bordering the foam fractionator section 33. The medium then passes through the foam fractionators 81 and is carried by a coupling pipe 52 to the carbon filter section 34. After passage through the filter substrates 91, the medium enters the filter outlet section 36 and is coupled therefrom back to the rearing tanks 4A through 4C by a return pipe 53.

Figure 7:
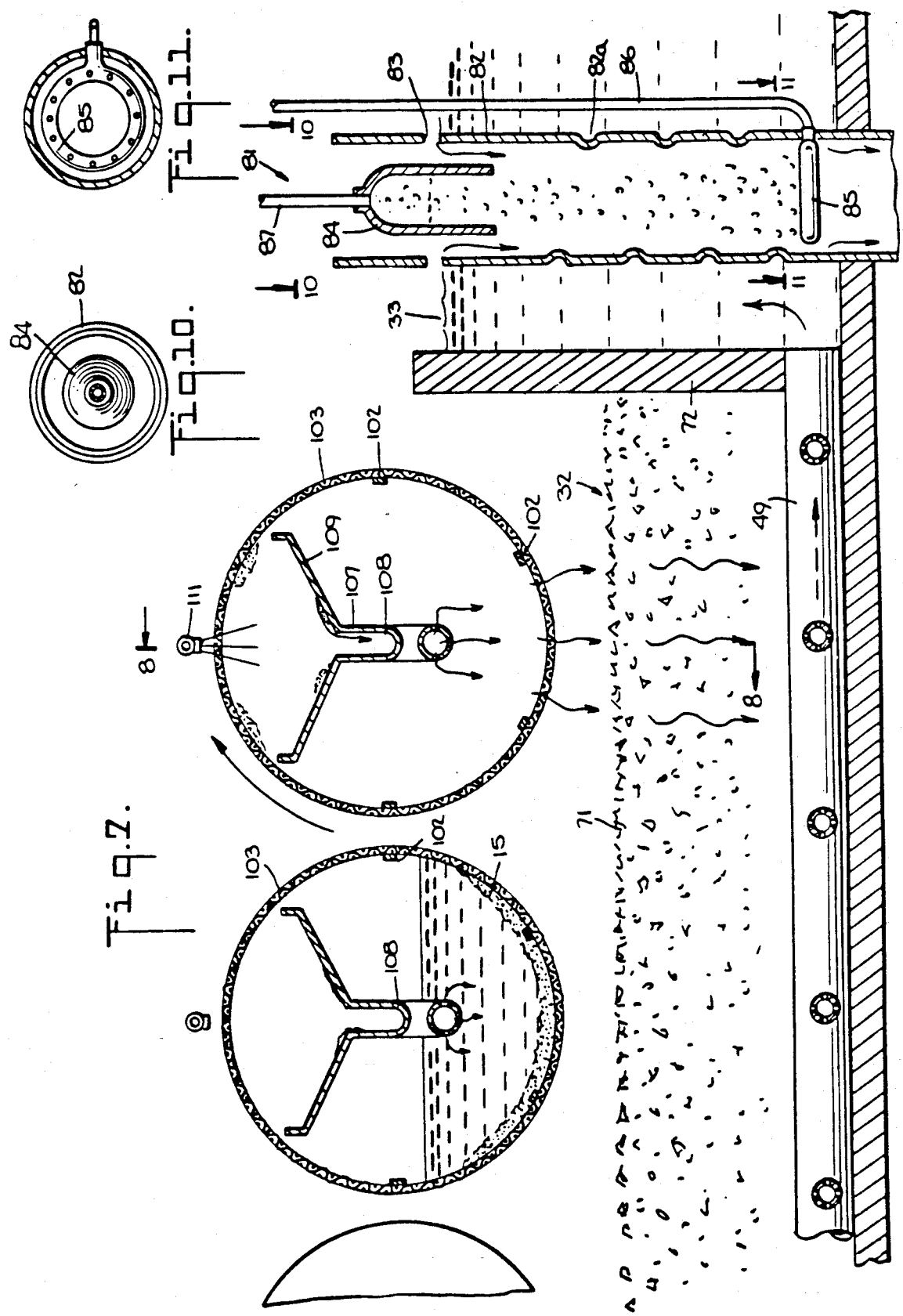
FIG. 7 shows a cross section of the bio-filter, particulate filters and foam fractionator of the filtration system of FIG. 6 taken along the line 7—7 of FIG. 6.
Figure 8:
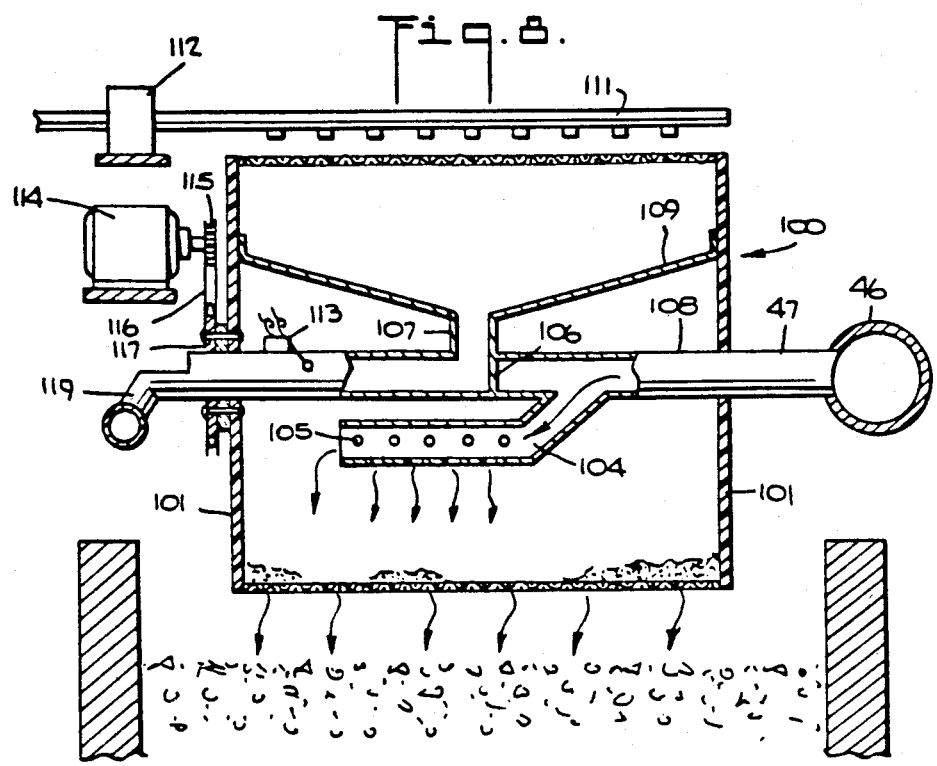
FIGS. 8 and 9 illustrate cross sections of the particulate filter and the bio-filter of FIG. 7, taken along the line 8—8 of FIG. 7.
Figure 9:
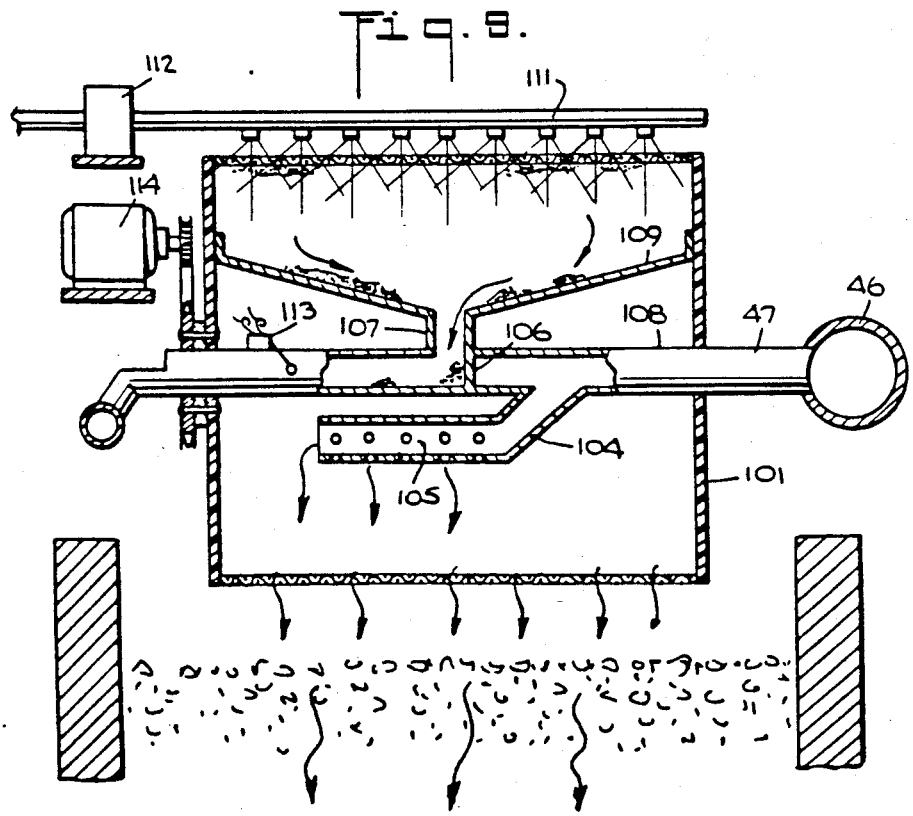

As above discussed, the particulate filter assembly 37 is formed from a plurality of similar particulate filters 100, each of which receives medium to be filtered via the manifold 46 connected to the output of the pump 38. The filters 100 filter particulate matter from the medium passing therethrough and operate on a backwash principle. As shown in FIGS. 7 through 9, each of the filters 100 is in the form of a cylindrical drum having opposite flat ends 101 comprised of a stiff material such as, for example, plexiglass. A plurality of support ribs 102 extend between the drum ends and suppport a layer of fine mesh net 103. The net 103 forms the cylindrical sidewalls of the drum and its ends are also attached to the drum ends. Extending centrally through the drum and rotatably mounted relative thereto is a conduit 108 whose input end forms one of the inputs 47 connected to the manifold 46. In the interior of the drum, a feed pipe 104 having an apertured end 105 branches off in a downward direction from the central conduit 108 and couples medium entering the drum input 47 to the lower portion of the drum. Slightly downstream from the feed pipe 104, the conduit 108 is blocked by a wall 106 beyond which a further feed pipe 107 extends upwardly toward the top portion of the drum. The feed pipe 107 couples filtered matter to the output end 119 of the conduit 108 which, in turn, is connected to a collector pipe (not shown) for carrying the matter out of the filtration area. The filtered matter is fed to the feed pipe 107 from a tray 109 located in the upper portion of the drum and having slanted side walls which lead to the pipe 107. The tray 109 receives this matter from the upper mesh portions of the drum when the matter is dislodged by the action of water sprayed from a spray bar 111 situated above the drum and extending along its length. Water is controllably fed to the spray bar 111 through a solenoid valve 112 which is coupled to a water source (not shown).

A float switch 113 supported on the central conduit 108 provides actuation of the solenoid valve 112 as well as a motor 114 provided for rotating the drum relative to the conduit 108 and the tray 109. The motor 114 drives a first sprocket wheel 115 which, in turn, drives via a chain 116, a second sprocket wheel 117 whose hub is connected to the drum end wall 101.

In operation, when the particulate matter filtered by the interior of the lower portion of the mesh of the drum builds up to a point where the medium 15 in the drum rises to a level at which it activates the float switch 113, the switch 113 then actuates the motor 114 and solenoid valve 112. This, in turn, causes the drum to rotate so that a clean section of mesh is not situated at the lower portion of the drum. Simultaneously, a clogged section of mesh at the upper portion of the drum is brought under the spray now being delivered from the spray bar 111. These actions cause the medium level in the drum to decrease and the particulate matter dislodged by the spray from the interior of the mesh to fall into the tray 109 and be carried out of the system. This will continue until the medium level in the drum decreases to a point where the float switch 113 is no longer activated. At this time, the motor 114 and solenoid 112 turn off and the medium passes through the mesh net until the interior of the net becomes sufficiently clogged to allow the medium to build to a level where it again activates the switch 113.

The particulate filters 100 thus remove a significant amount of particulate debris from the medium 15 being delivered by the pump 34 as the medium passes downward through the filters into the bio-filter section 32. As shown, the latter section encompasses a large enclosed area of the tank 31. This area is filled with a layer of coral rock gravel 71 which is impregnated with nitrification bacteria. Passage of the medium 15 through the bio-filter thus results in removal of a significant amount of metabolic wastes.

As noted previously, below the gravel 71 in the bio-filter area 32 are disposed apertured pipes 48 for receiving the medium after it has passed through the filter. These pipes carry the medium to the collector pipe 49 which leads the medium through the aperture 51 in the wall 72 separating the foam fractionator section 33 from the bio-filter section 32.

As above-indicated, the foam fractionator section 33 includes four foam fractionators 81 each of similar construction, for removing further contaminants and, in particular, large organic molecules such as proteins, from the introduced medium from the pipe 49. As shown in FIGS. 6, 7, 10 and 11, each fractionator 81 comprises a pipe 82 having helical indentations 82a along its length and apertures 83 at its upper end for receiving the introduced medium. A cylindrical collector or funnel 84 is supported centrally within the pipe 82 and extends downwardly past the apertures 83. At the lower end of the pipe 82, an apertured annular bar 85 is provided for introducing air to the downwardly flowing medium. The bar 85 receives air from an air line 86 coupled to an air source (not shown).

As can be appreciated, the medium flowing into the fractionator section 33 rises to the height of apertures 83 in the pipes 82 of the fractionators 81, thereby causing medium to descent downwardly through each pipe. The air introduced from the respective bars 85, in turn, causes bubbles to ascend upwardly through each pipe. These ascending bubbles interact with the descending medium causing large organic molecules to be stripped therefrom. The bubbles with the attached organic molecules then continue their upward ascent and are collected by the respective collectors 84. The collected material in the collectors is then conveyed out of the system by the lines 87 and discarded.

The foam fractionators 81 thus remove further waste material from the medium 15 which, after reaching the bottom of the fractioner section 33, is coupled by the pipe 52 to the carbon filter section 34. This section includes a plurality of hollow substrates 91 which are filled with carbon. The hollow substrates 91 are slidably retained for easy removal and replacement between pairs of vertical channels 92 affixed to opposite walls of the carbon filter section 34. The medium passes from the pipe 52 through the substrates 91 and then enters the outlet section 36. The return pipe 53 then carries the filtered medium back into the rearing tanks 4A to 4C.

As can be appreciated, the combined effect of the particulate filters, bio-filter, foam fractionators and carbon filters of the present invention results in a significant amount of contaminants being extracted from the medium of the rearing tanks. As a result, the quality of the medium is maintained at a high level, thereby promoting shrimp growth and limiting shrimp mortality.

A further cleaning operation can also be carried out to aid the filtration system in maintaining the medium quality. This cleaning operation results in cleaning the bottom walls of the rearing tanks along which debris which cannot be effectively filtered is gathered. More particularly, a conventional automatic pool cleaner, suitably modified, is inserted into each tank after the substrate units have been raised from the medium. This robot scrapes the tank bottom and any accumulated detritus material is removed and carried out of the rearing building by suitable piping.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method of transferring post-larvae shrimp from a tank having a closeable opening in a sidewall comprising:

culling from the total population of shrimp in said tank a shrimp subpopulation comprising shrimp which have undergone a preselected period of growth, said step of culling including surrounding said total population of shrimp with a net having mesh openings of a size approximately equal to the size of shrimp forming said shrimp subpopulation and inducing shrimp smaller than those forming said shrimp subpopulation to move through said mesh openings by constricting said net around said total population of shrimp;

confining said culled shrimp in a localized area of said tank including said closeable opening;

and opening said closeable opening.

2. A method of transferring in accordance with claim 1 wherein said closeable opening leads to a further tank situated adjacent said tank, said further tank having a further closeable opening in a sidewall wherein said method further comprises:

culling from the total population of shrimp in said further tank a shrimp subpopulation comprising shrimp which have undergone a further preselected period of growth, said step of culling including surrounding said total population of shrimp with a net having mesh openings of a size approximately equal to the size of shrimp forming said shrimp subpopulation and inducing shrimp smaller than those forming said shrimp subpopulation to move through said mesh openings by constricting said net around said total population of shrimp;

confining the culled shrimp of said further tank in a localized area of said further tank including said further closeable opening;

and opening said further closeable opening.

* * * * *